United States Patent

Miyoshi et al.

[11] Patent Number: 5,900,259
[45] Date of Patent: * May 4, 1999

[54] MOLDING CONDITION OPTIMIZING SYSTEM FOR INJECTION MOLDING MACHINE

[75] Inventors: Yoji Miyoshi; Hiroharu Orita; Kenji Hayakawa, all of Nagaoka; Jun Imai; Koei Ozeki, both of Omiya, all of Japan

[73] Assignee: Niigata Engineering Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/643,474

[22] Filed: May 6, 1996

[30] Foreign Application Priority Data

Jun. 6, 1995 [JP] Japan ..................................... 7-139717
Sep. 28, 1995 [JP] Japan ..................................... 7-251655

[51] Int. Cl.$^6$ ................................................. B29C 45/77
[52] U.S. Cl. ........................ 425/145; 264/40.5; 264/40.7; 425/149
[58] Field of Search ..................................... 425/135, 145, 425/149; 264/40.5, 40.7

[56] References Cited

U.S. PATENT DOCUMENTS 5,350,546   9/1994   Takeuchi et al. ........................ 425/135

FOREIGN PATENT DOCUMENTS

| 0 257 099 A1 | 3/1988 | European Pat. Off. . |
| 0 368 300 A2 | 5/1990 | European Pat. Off. . |
| 0 377 736 A1 | 7/1990 | European Pat. Off. . |
| 0 607 431 A1 | 7/1994 | European Pat. Off. . |
| 0 698 467 A1 | 2/1996 | European Pat. Off. . |
| 0 699 514 A2 | 3/1996 | European Pat. Off. . |
| 40 25 221 A1 | 2/1992 | Germany . |
| 7-20651      | 5/1990 | Japan . |
| 2-128824     | 8/1995 | Japan . |

OTHER PUBLICATIONS

The Condensed Chemical Dictionary, p. 871, 1981.

*Primary Examiner*—Tim Heitbrink
*Attorney, Agent, or Firm*—Scully, Scott Murphy and Presser

[57] ABSTRACT

A molding condition optimizing system for an injection molding machine comprising plastic flow condition optimizing section and an operating condition determining section is disclosed. The plastic flow condition optimizing section carries out a plastic flow analysis on a molded part model, and determines an optimum flow condition in a filling stage and a packing stage of an injection molding process of the injection molding machine by repeatedly executing an automated calculation using the result of the plastic flow analysis and the plastic flow analysis itself. The operating condition determining section comprises an injection-side condition determining section for determining an optimum injection-side condition of the injection molding machine according to the optimum flow condition obtained by the plastic flow condition optimizing means and a knowledge database with respect to an injection condition, and a clamping-side condition determining section for determining an optimum clamping-side condition according to the molded part form data generated by the plastic flow condition optimizing means, the result of the plastic flow analysis, mold design data, and a knowledge database with respect to a mold clamping condition.

6 Claims, 7 Drawing Sheets

MOLDING CONDITION OPTIMIZING SYSTEM FOR INJECTION MOLDING MACHINE

BACKGROUND OF THE INVENTION

1. Field of the Invention

The present invention relates to a technique for injecting melt such as a melted plastic into a mold by using an injection machine, and relates in particular to a system for automatically determining the optimum molding conditions necessary to produce molded parts having a required quality.

2. Background Art

In one production method for molded parts, it is necessary to determine optimum molding conditions and to control an injection machine according to the optimum molding conditions thus determined.

Conventional methods for determining such optimum molding conditions, require a skilled-operator to determine the optimum molding condition, drawing upon his experience with respect to injection molding techniques. More specifically, the skilled-operator repeats the production of the molding parts and the evaluation of the produced molding parts modifying the condition of the injection molding machine and determines the optimum molding conditions through trial and error production.

In this method, whether or not preferred optimum molding condition is obtained depends on the skill of the operator who determines the molding conditions. Therefore, an apprenticeship training is very important. However, it is difficult to obtain such skilled operators. Therefore, a system in which an operator can easily obtain the optimum molding conditions, even if he is an amateur with no experience with injection molding, is desired.

On the other hand, a system is used for obtaining a good mold design. In this system, a model is made by a computer based on a form of a molding part to be produced. A plastic flow analysis is then carried out by the computer. In this analysis, the plastic flow under molding conditions which are inputted by an operator is simulated. The design of the molding part is then determined based on the result of the plastic flow analysis.

However, this system has no evaluation means for evaluating the result of the plastic flow analysis and the system provides only the plastic flow analysis result corresponding to the molding conditions inputted by the operator. Therefore, a person who has skill with respect to the injection molding technique should repeat the following steps in order to obtain the optimum molding conditions.

a. Evaluating the result of the plastic flow analysis obtained by the system b. Modifying the molding condition based on his knowledge referring to the result c. Inputting the modified molding condition to the system to obtain the next plastic flow analysis and returning to the evaluation of the next result of the analysis (step-a)

That is to say, a skilled-person is necessary in order to obtain the optimum molding conditions using this system.

Recently, a molding condition optimization system is developed in order to overcome the above problem. This system has an evaluation function for evaluating the result of the analysis and a modification function for automatically modifying the molding conditions according to the evaluation, and determines the optimum molding conditions by automatically repeating the calculation based on these functions.

On the other hand, Japanese Patent Second Publication No. Hei 7-20651 discloses an injection molding condition setting system. This system determines the optimum molding condition by executing the following steps.

a. Instead of the use of the molding condition optimization system described above, the plastic flow analysis is repeatedly carried out by using a flow analysis system, which is a software executed by a computer, under the control of a skilled-operator.

b. An initial molding condition for actual molding and allowable ranges of parameters of the molding condition are determined according to the result of the reported analysis obtained from the flow analysis system and knowledge of the skilled-operator.

c. A test-shot is carried out using an injection molding machine to produce molding parts.

d. An information with respect to the defective molding of the molding parts is inputted to a condition improving system in a computer by a operator so as to obtain an improved molding condition.

e. A test-shot is carried out again based on the improved molding condition.

Not all the operations of this injection molding condition setting system are executed by the computer. The system makes good use of the judgment of the operator, who has some technical skill, in order to judge the result of the flow analysis, and makes good use of the operator'ss Judgment for detecting the defective molding of the molding parts obtained through the test-shot. The remaining operations are automatically executed by the computer. In this manner, the optimum molding condition is obtained by combining human operation and computer operation.

Comparing the two systems described above, it is clearly understood that the molding condition optimization system is superior to the injection molding condition setting system. This is because, the molding condition optimization system does not require the test-shot and the operator's judgment.

However in practice, when an unskilled operator uses the molding condition optimization system, it is impossible to obtain the actual optimum molding conditions and to carry out the injection molding. This is because the molding condition optimization system has the following problems.

(1) The system provides only injection conditions as the optimum molding conditions. The optimum clamping side condition is not obtained from the system. Unskilled operators cannot determine the optimum clamping side condition and therefore cannot carry out the injection molding.

(2) The optimum molding condition provided by the system Is obtained based on theory. Therefore, there are a few differences between the optimum molding condition provided by the system and the actual optimum molding condition to be set to the concrete injection molding machine. Thus, the operator should evaluate the effect of the injection molding based on the molding parts produced by the injection molding machine and carry out by his knowledge a modification or transformation on the optimum molding condition provided by the system based on the evaluation in order to obtain an actual optimum molding condition.

SUMMARY OF THE INVENTION

Accordingly, it is an object of the present invention to provide a system for determining the actual optimum molding conditions for an injection molding machine by which unskilled operators having no technical skill or knowledge can determine the optimum molding conditions.

Specifically, the object is to offer an optimum molding condition setting system which allows even an amateur without the help of a skilled operator to set the optimum molding conditions of an injection molding apparatus by (1) automatically making the optimum molding conditions without any professional knowledge, and (2) in cases wherein defects occur, correcting the condition without any professional knowledge.

In an aspect of the present invention, there is provided a molding condition optimizing system for an injection molding machine. The system comprises a plastic flow condition optimizing section and an operating condition determining section.

The plastic flow condition optimizing section is a means for carrying out a plastic flow analysis on a molded part model thus generated, and for determining an optimum flow condition corresponding to a filling stage and a packing stage of an injection molding process by repeatedly executing an automated calculation according to an optimization algorithm.

The operating condition determining section is a means for determining the actual optimum molding condition of the injection molding machine according to data supplied from the plastic flow condition optimizing section.

This actual optimum molding condition consists of an injection-side condition and a clamping-side condition.

The operating condition determining section has an injection-side condition determining section and a clamping-side condition determining section in order to obtain these conditions.

The injection-side condition determining section determines the actual injection-side condition of the injection molding machine using both the optimum flow condition supplied from the plastic flow condition optimizing section and a knowledge database with respect to injection conditions.

On the other hand, the clamping-side condition determining section determines the actual optimum clamping condition using the molding part form data generated by the plastic flow condition optimizing section, and the mold design data, and a knowledge database with respect to the clamping-side conditions.

The actual optimum injection condition thus determined by the injection condition determining section and the actual optimum clamping condition thus determined by the clamping condition determining section are supplied to the injection molding machine as the actual optimum molding conditions.

As a result, molding parts having a high quality are produced by the injection molding machine according to the actual optimum molding conditions.

Other objects and features of this invention will be understood from the following description with reference to the accompanying drawings.

DETAILED DESCRIPTION OF THE PREFERRED EMBODIMENTS

Hereinbelow, preferred embodiments of the present invention will be explained with reference to the Figures.

First Preferred Embodiment

Figure 1:
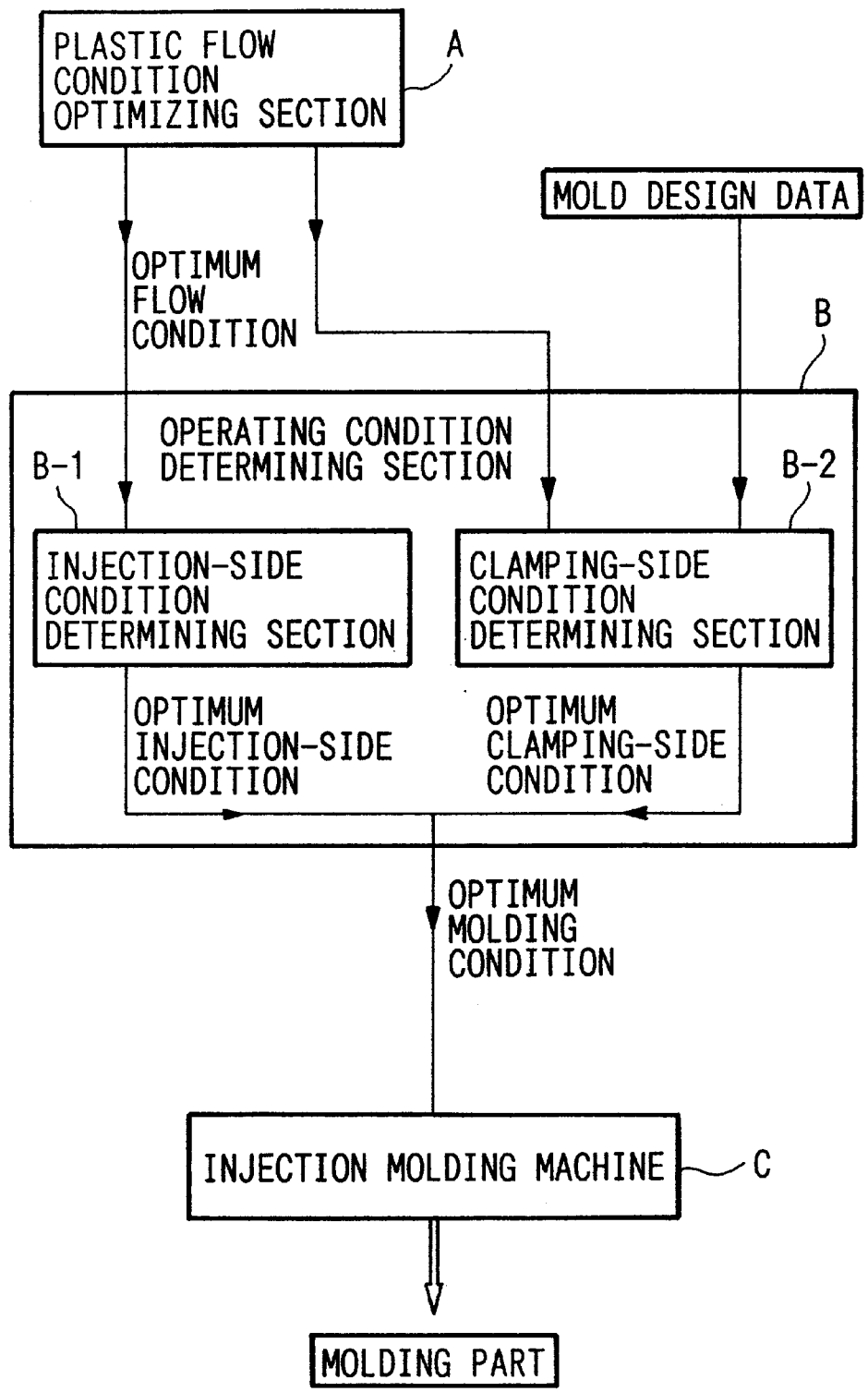
FIG. 1 is a block diagram showing a configuration of a molding condition optimizing system for an injection molding machine according to a first preferred embodiment of the present invention.

FIG. 1 is a block diagram showing a configuration of a molding condition optimizing system for an injection molding machine according to a first preferred embodiment of the present invention.

This system is constructed so as to calculate all optimum molding condition data required for both injection control and clamping control of an injection molding machine and to supply the optimum molding condition data thus calculated to the injection molding machine.

The system has a plastic flow condition optimizing section A and an operating condition determining section B. The operating condition determining section consists of an injection-side condition determining section B-1 and a clamping-side condition determining section B-2. These sections are means which are provided in a computer.

When the system is operating, required data are supplied from the plastic flow condition optimizing section A to the operating condition determining section B, and from the operating condition determining section B to the injection molding machine C, and predetermined operations are carried out by these sections.

Details of each section of the system will be shown below.
(1) Plastic Flow Condition Optimizing Section A
Generation of Molding Part Form Model In this plastic flow condition optimizing section A, an operator makes a molded part model corresponding to a molding part to be molded.

After this molding operation, the plastic flow condition optimizing section A generates molded part form data such as the project area, the height, the thickness, the gate dimensions, and the height of the spree of the molded part, referring to the data of the model.

The generation of the molded part form data is carried out according to the following method, for example.

a. The operator inputs the form of the molded part by operating a keyboard or a pointing device. The form thus inputted is displayed on a display of the computer.

b. The computer automatically determines the molded part form data based on this molded part model thus inputted.

The generation method of the molded part form data is not limited in the above method. There are possible modifications of the above method. For example, the operator may directly input the molding part form data by operating an input device such as a keyboard or a mouse.

Input of Plastic Data

The plastic flow condition optimizing section A holds a database of plastic data of various types of plastics. Each of the plastic data includes information which defines the characteristics of each plastic such as viscosity, temperature characteristics, and PVT characteristics.

When using the system, the operator inputs a plastic grade name into the system in order to designate a plastic to be used for the injection molding. As a result, the plastic data corresponding to the plastic grade name thus inputted are read out from the database and the plastic data thus read out are used for calculation which will be described later.

Input of Performance Data of Injection Molding Machine

The operator inputs the performance data of the injection molding machine. The performance data includes information which defines the maximum injection pressure, the maximum injection speed, and the screw diameter of the injection molding machine.

Execution of Plastic Flow Analysis

The plastic flow condition optimizing section A repeatedly executes a plastic flow analysis on the model according to a predetermined optimization algorithm by using the data which are inputted or generated as described above. As a result, the following data are obtained.

a. Optimum injection speed profile

In a filling stage of the injection molding, the screw of the machine advances toward the mold to inject plastics. The optimum injection speed profile is a group of optimum injection speed data corresponding to the positions of the screw in the filling stage.

b. Optimum packing pressure profile

In a packing stage of the injection molding, the optimum packing pressure varies as time passes. The optimum packing pressure profile is a group of optimum packing pressure data corresponding to the passing of time during the packing stage.

Example of Optimization Algorithm

If injection molding is carried out at an optimum injection speed profile, the warp of the molded part is minimized. This optimum injection speed should satisfy the following requirements.

a. When the melted plastic is being filling into the mold in the filling stage, it is desirable that the flow front of the melted plastic be constant over time.

b. When the above-described filling stage is completed, each part of the melted plastic filled in the mold will have
a minimized temperature difference.

In this preferred embodiment, the optimum injection speed profile as described above is determined in a method which consists of the following steps.

(i) Setting the maximum injection speed as an initial value, a first analysis is started. More specifically, a calculation is carried out to determine the flow of the melting plastic which is being filled into the molding part model at the maximum injection speed. As a result, the sectional square of the flow front of the melting plastic in time step is obtained.

(ii) The maximum share rare of the melting plastic at the time when the flow front of the melted plastic passes through the runner of the mold is calculated by the sectional square obtained in the step (i).

Then, the maximum share rate thus calculated is compared with a recommended maximum share rate in the database of plastic data.

If the calculated maximum share rate exceeds the recommended maximum share rate, the screw advance speed is adjusted so that the calculated maximum share rate does not exceed the recommended maximum share rate.

(iii) Then, the injection speed profile is calculated. In the injection speed profile, the injection speed at each time step is determined so as to be proportional to the sectional square of the flow front, based on the injection speed obtained in (ii).

In other words, the profile is a group of screw advance speed data corresponding to the above-described time steps. The screw advance speed data at each time step is determined by the sectional square of the flow front of the melting plastic at the same time step. If the sectional square of the flow front is larger, a higher speed is set as the screw advance speed data. If the sectional square of the flow front is smaller, a lower speed is set as the screw advance speed data.

(iv) A second analysis is carried out on the model using the injection speed profile which has been obtained in the step (iii).

In the second analysis, the temperature of the melting plastic at the completion timing of the filling stage is obtained.

If the temperature of the melted plastic is too high, the maximum injection speed in the profile is decreased and the injection speed profile is modified so as to be proportional to the maximum injection speed thus decreased. If the temperature of the melting plastic is too low, the maximum injection speed is increased and the injection speed profile is modified so as to be proportional to the maximum injection speed thus increased.

(v) The step (iv) is repeatedly executed until the temperatures of each part of the melted plastic filled in the mold is within an allowable range of temperature which comes from the plastic database. Finally, an optimum injection speed profile is obtained.

Next, the method for determining the optimum packing pressure will be described. In order to determine the optimum packing pressure, analyses are carried out by using the optimum injection speed profile obtained through the above-described steps (i)–(v) as an initial condition. In this analysis, the optimum packing pressure is determined so as to minimize the difference of the shrinkage of each part of the molded part. In the analysis, an automated repeating calculation, which is similar to the calculation for determining the optimum injection speed, is carried out by adjusting the packing pressure and the packing time. As a result, the optimum packing pressure profile indicating the optimum packing pressure in time step is obtained.

More specifically, the packing pressure is calculated by the optimum injection speed obtained in the above described steps (i)–(v). Then, the shrinkage is calculated by both of the packing pressure thus calculated and a predetermined packing time. In the next step, a lot of calculations are performed by changing both the values of the packing pressure and the packing time to find a relation between shrinkage and packing pressure/time. As a result, a combination of a packing pressure, and a packing time, which minimize the difference in shrinkage, is obtained. The optimum packing pressure profile is generated by the optimum packing pressure in time step and the optimum packing time thus determined.

In this manner, the optimum flow condition including the optimum injection speed profile and the optimum packing pressure profile is obtained.

Furthermore, peripheral condition data such as cooling time of a molded part and a required mold clamping force in the optimum flow condition are simultaneously calculated as well.

The data obtained by the plastic flow condition optimizing section A, i.e., the optimum flow condition including the optimum injection speed profile and the optimum packing pressure profile, and the molding part form data including the project area, the height, the gate dimension of the molding part, the peripheral condition data including the cooling time, and the required mold clamping force are supplied to the operating condition determining section B.

(2) Operating Condition Determining Section B

The operating condition determining section B has a injection-side condition determining section B-1 for determining control values of the injection-side devices of the injection molding machine and a clamping-side condition determining section B-2 for determining control values of the clamping-side devices of the injection molding machine.

Injection-Side Condition Determining Section B-1

The injection-side condition determining section B-1 receives the optimum flow condition, the molding part form data, and the peripheral condition data, and determines the optimum injection-side condition based on the received data and a knowledge database, which is stored in a memory, as follows.

(i) Control of Transition Point of Injection Process

Basically, the optimum flow condition may be used for controlling the injection process of the injecting molding machine. However, if the optimum flow condition is directly used for the actual injection process, a problem which is the so called "overpack" may be caused when the injection molding process makes the transition from the filling stage to the packing stage.

This problem is caused by a small difference between the cavity capacity of the actual mold and the cubic volume of the molding part model used for the flow analysis. The main cause of the difference is that the molding part model is made by ignoring small radius parts of the cavity such as corner. If the optimum flow condition is determined based on such a molding part model and the injection process is controlled based on the optimum flow condition thus determined, problems such as the breakage of the mold may occur.

In order to prevent such problems, margin data are read out from a database which is previously made through experiments and stored in the memory, and the margin data thus read out are added to the values of the optimum flow condition in order to shift the transition point at which the injection process makes the transition from the filling stage to the packing stage.

(ii) Setting of Cooling Time

The peripheral condition data supplied from the plastic flow condition optimizing section A includes the cooling time. This cooling time may be applied to the actual injection molding with no modification.

(iii) Setting of Screw Revolution Speed

Section A does not give data in regard to the screw revolution speed in the plasticizing process.

Therefore, the data of the screw revolution speed are using both values of the cooling time included in the peripheral condition data supplied from the plastic flow condition optimizing section A and the plasticizing capacity of the injection molding machine C stored in a knowledge database, obtained through a calculation, which is done so that the plasticizing is completed with in the cooling time.

In this manner, all the data of the optimum injection-side condition required are obtained.

Clamping-Side Condition Determining Section B-2

The clamping-side condition determining section B-2 determines the optimum clamping-side condition based on the molding part form data, the peripheral condition data, the mold design data, and an knowledge database previously stored.

The molding part form data is a group of information such as the height and the thickness of the molding part, and the height of the sprue. This molding part form data is supplied from the plastic flow condition optimizing section A.

The mold design data is a group of information such as the mold height, and the information of whether angular pin is provided or not, and the maximum ejector stroke. Therefore, the operator can easily obtain and input this information from the drawings of the mold design or the concrete mold.

The data processing of the clamp-side condition determining section B-2 is carried out as follows below.

(i) Setting of Mold Clamping Force

The peripheral condition data supplied from the plastic flow condition optimizing section A includes information designating a value of a required mold clamping force.

However, this force is the minimum force required for mold clamping. If the mold clamping is carried out at such a minimum force, problems such as a flash may be caused. In order to prevent the problem, a margin should be added to the mold clamping force.

In this preferred embodiment, therefore, margin percentages to be applied are stored as the knowledge database of the clamping-side condition determining section B-2. The specified margin percentage corresponding to the plastic used for the injection molding is read out from the database. The value of the required mold clamping force is then multiplied by the margin percentage thus read out so as to obtain the optimum mold clamping force.

(ii) Setting of Opening Stroke

The molding part form data supplied from the plastic flow condition optimizing section A includes information designating the height of the molding part and the height of the sprue.

In order to determine the optimum opening stroke, the knowledge database of the clamping-side condition determining section B-2 defines an equation with respect to the relationship between the height of the molding part, the height of the sprue, and the optimum opening stroke. Showing an example below:

Optimum opening stroke =Height of molding part * 2.3 Height of Sprue

The clamping-side condition determining section B-2 calculates the optimum opening stroke according to the equation defined in the database, with the height of the molding part and the height of the sprue defined in the molding part form data.

(iii) Setting of Opening and Closing Speed

The molding part form data supplied from the plastic flow condition optimizing section A includes information designating the thickness of the molded part. The mold design data includes information of whether or not an angular pin is provided.

In order to determine the optimum opening and closing speed, the knowledge database of the clamping-side condition determining section B-2 defines-an equation with respect to the relationship between the thickness of the molding part, and the information of whether or not an angular pin is provided, and the optimum opening and closing speed.

The clamping-side condition determining section B-2 then calculates the optimum opening and closing stroke according to the equation and the data.

(vi) Setting of Ejector Stroke

The mold design data includes information designating the maximum ejector stroke of the mold.

On the other hand, the knowledge database of the clamping-side condition determining section B-2 defines a margin data with respect to the ejector stroke.

The optimum ejector stroke is obtained by subtracting the margin data from the maximum ejector stroke.

The margin data is pre-determined so that the ejector does not make a collision with the mold structure when the ejector is actuated.

(v) Setting of Ejector Speed

The molding part form data supplied from the plastic flow condition optimizing section A designates the thickness of the molding part.

The knowledge database of the clamping-side condition determining section B-2 defines an equation respect to the relationship between the thickness of the molding part and the optimum ejector speed.

The clamping-side condition determining section B-2 then determines the optimum ejector speed according to the equation and the thickness of the molding part.

As described above, all the data of the optimum clamping side condition are determined through the data processing of the steps (i)–(v) by the clamping-side condition determining section B-2.

Both the optimum injection-side condition determined by the injection-side condition determining section B-1 and the optimum clamping-side condition determined by the clamping-side condition determining section B-2 are then supplied to the injection machine C to control the injection molding process.

As described above, in the preferred embodiment of the molding condition optimizing system, all the data of the optimum injection-side condition and all the data of the optimum clamping-side condition are calculated by the plastic flow optimizing section A and the operating condition determining section B, in a computer, and then, all operational parameters of the injection molding machine C are set in accordance with data. Therefore, the knowledge of a skilled-operator is not necessary to carry out the injection molding by the injection molding machine.

The injection molding machine C can be a hydraulic type injection molding machine.

However, an all-electric type injection molding machine is more suitable for the system of the preferred embodiment than the hydraulic type injection molding machine. This is because, the actual operation of a hydraulic type machine fluctuates due to disturbances such as changes of air or oil temperature and such fluctuations necessitates re-adjustment of molding conditions which can be done only by a skilled-operator. All-electric type injection molding machines do not have such fluctuations.

Second Preferred Embodiment

In the above-described first preferred embodiment, there are cases in which a lag is generated between the data calculated by the plastic flow condition optimizing section A and the actual operation carried out by the injection molding machine C.

The example of the lag is the above-described problem of "overpack" which is caused when the injection process makes the transition from the filling stage to the packing stage.

In the first preferred embodiment, this problem is overcome by controlling the injection molding process based on the knowledge database.

Figure 2:
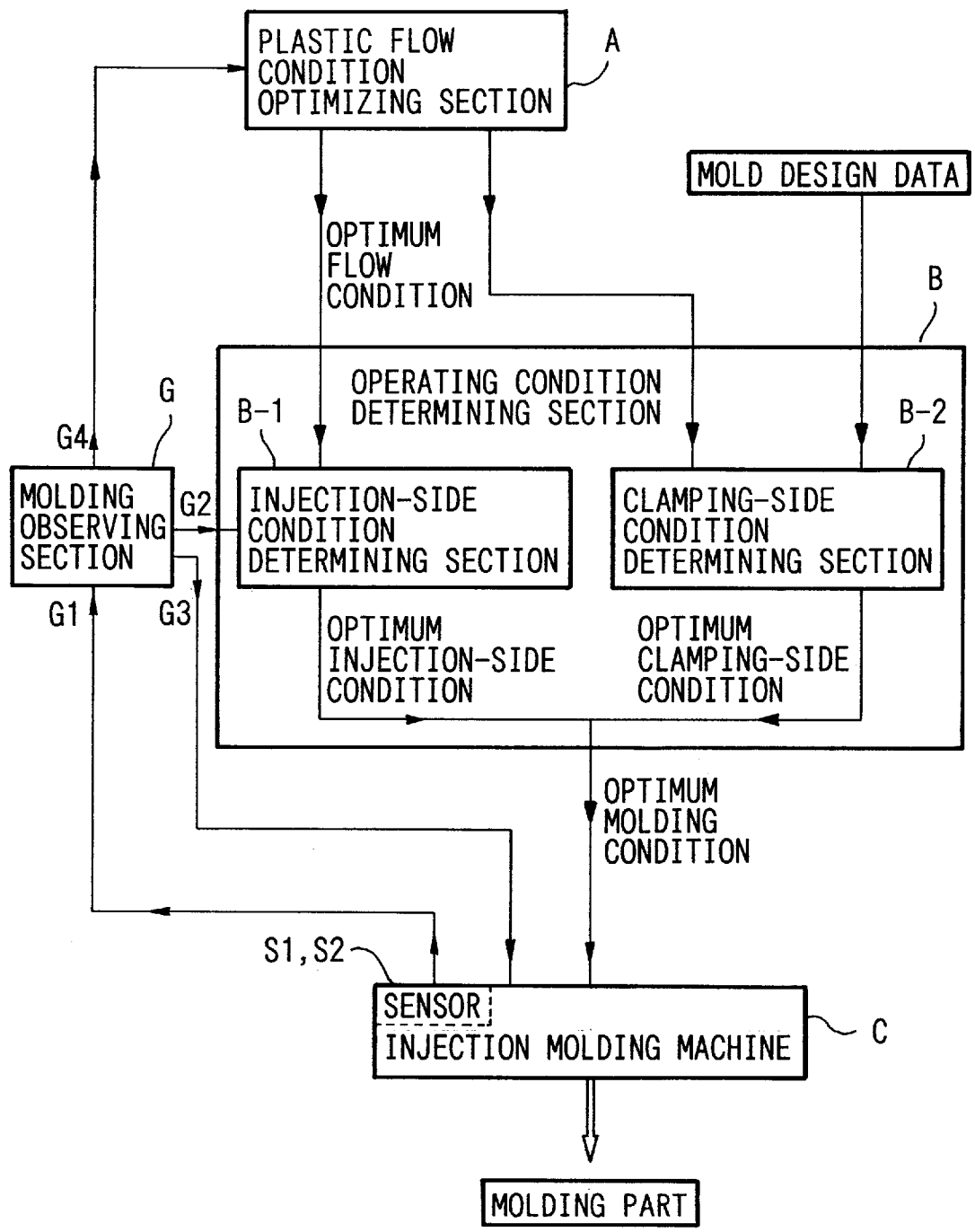
FIG. 2 is a block diagram showing a configuration of a molding condition optimizing system for an injection molding machine according to a second preferred embodiment of the present invention.

In the second preferred embodiment of the present invention, a molding observing section G is added as shown in FIG. 2 in order to overcome the problems such as "overpack". As shown in-FIG. 2, a plurality of sensors such as a plastic pressure sensor S1 and a plastic temperature sensor S2 are fixed to the injection molding machine C to observe the status of the injection molding process. Data indicating the status such as the pressure and the temperature of the plastic being injected are obtained via these sensors and are supplied to the molding observing section G.

The molding observing section G then examines the data received from the sensors, and supplies the result of the examination to the operating condition determining section B. to the plastic flow condition optimizing section A, or to the injection molding machine C.

As a result, the injection molding process is modified according to the result of the examination.

The operations described as follows are examples of such a operation.

(1) Operation for Correcting Lag of Filling/Packing Transition Point

Figure 6:
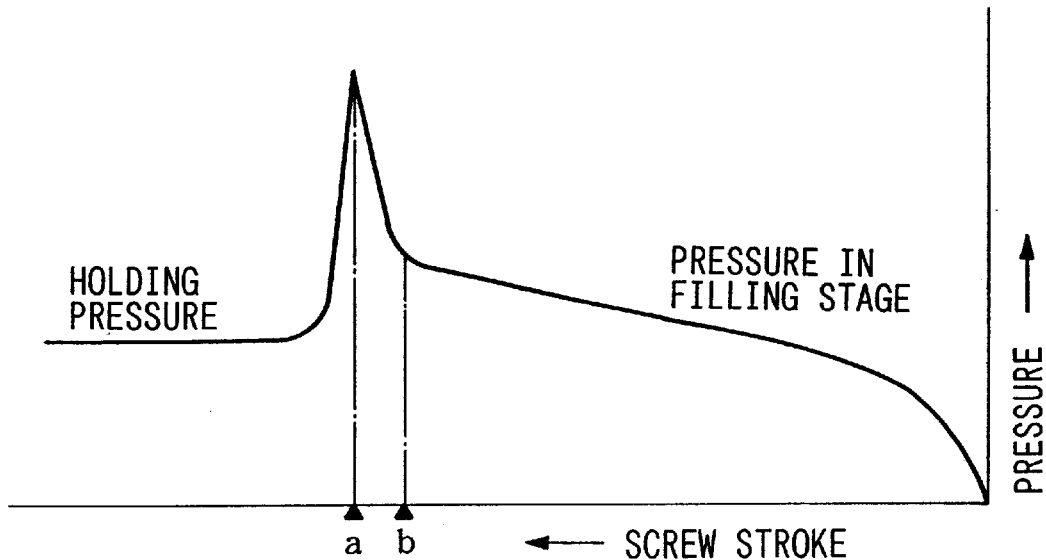
FIG. 6 shows a variation of an injection pressure in an injection stage of an injection molding process.

FIG. 6 shows the variation of the injection pressure in the injection stage in which the overpack is occurs.

In FIG. 6, the injection molding process is making a transition from the filling stage to the packing stage at a transition point "a" which is designated by the data supplied from the plastic flow condition optimizing section A. However, the cavity of the mold is fully filled by the plastic before the screw reaches the transition point "a". Therefore, the pressure of the plastic at the point "a" is excessively high. As a result, the overpack occurs.

In the case shown in FIG. 6, the injection molding process should make the transition from the filling stage to the packing stage at a point "b" at which the cavity of the mold is just fully filled by the plastic. However, the transition is carried out at the point "a". This lag between the point "a" and the point "b" is the cause of the overpack problem.

In the system shown in FIG. 2, the plastic pressure in the injection stage is sensed by the plastic pressure sensor S1, which is fixed to the injection molding machine C, and the plastic pressure data G1 indicating the plastic pressure is supplied to the molding observing section G from the sensor S1.

The molding observing section G calculates the relationship between the plastic pressure and the screw position, which forms a plastic pressure curve, and sequentially calculates the gradient of the plastic pressure curve. In this calculation, the molding observing section G determines the transition point "b", at which the gradient of the plastic pressure curve exceeds a predetermined value. This point "b" is the ideal transition point at which the injection molding process should make the transition from the filling stage to the packing stage.

There is another method for determining the ideal transition point "b". In this method, the characteristic of the screw speed, that the screw speed is suddenly decreased in the overpack region, is noted and the transition point is determined according to the-relationship between the screw speed and the screw position.

In the preferred embodiment, the ideal transition point "b" is determined as described above when the injection molding of the first molding part is carried out. The molding observing section G supplies a data G1 indicating the ideal transition point "b" thus determined for the operating condition determining section B. The operating condition determining section B updates the transition point "a" to the ideal transition point "b". As a result, the injection molding after the second molding part is controlled based on the new transition point b. Therefore, the overpack problem does not occur.

Meanwhile, in the method described above, the overpack problem may occur when the injection molding of the first molding part is carried out. In order to prevent the overpack in the injection molding of the first molding part, the following method is effective.

When the molding observing section G detects the ideal transition point "b", the molding observing section G immediately supplies a data G3 indicating the ideal transition point "b" to the injection molding machine C.

In the injection molding machine C, the filling stage is stopped as soon as the data are received and the injection molding process makes the transition to the packing stage.

Furthermore, the information indicating the transition point stored in the injection molding machine C is updated by the data G3 indicating the ideal transition point "b". As a result, the injection molding thereafter is controlled by the ideal transition point.

As shown above, the injection molding for all molding parts including the first molding part is carried out without the "overpack" problem.

(2) Operation for Correcting Lag of Plastic Temperature

Figure 7:
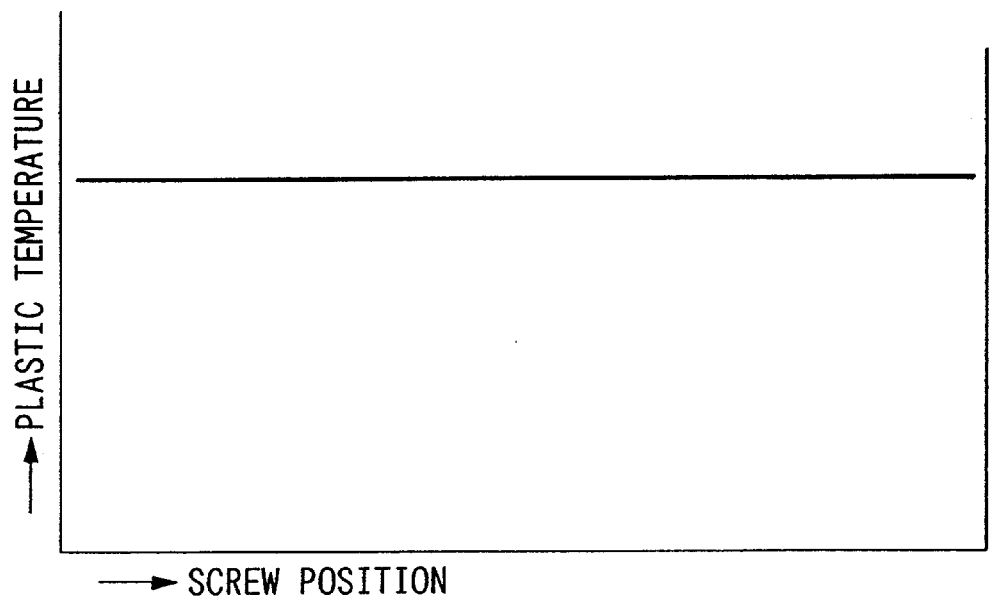
FIGS. 7 and 8 show example of a temperature of a plastic in an injection molding process.
Figure 8:

The temperature of the plastic flowing into the cavity of the mold is a very important factor for the injection molding process. In the plastic flow condition optimizing section A, however, the calculation is carried out on the precondition that the temperature of the plastic is constant in the filling stage as shown in FIG. 7. The behavior of the plastics during the plasticizing process, which determines the temperature of the plastic, is too complex, and it is therefore practically impossible to calculate the temperature. However, the actual temperature of the plastic is varied as shown in FIG. 8, and such a variation of the actual plastic temperature is not reflected in the precondition of the calculation of the plastic flow condition optimizing section A at all. That is to say, there is a lag between the plastic temperature used as the precondition of the calculation of the plastic flow condition optimizing section A and the actual plastic temperature in the filling stage.

In the system shown in FIG. 2, the plastic temperature in the injection stage is measured by the plastic temperature sensor S2 fixed to-the injection molding-machine C, and data G1 indicating the plastic temperature is supplied from the sensor S2 to the molding observing section G.

The molding observing section G generates plastic temperature measurement data G4 indicating a group of plastic temperatures, which correspond to a plurality of screw positions in the injection stage, based on the data GI supplied from the sensor S2. The plastic temperature measurement data G4 thus generated is supplied to the plastic flow condition optimizing section A.

In the plastic flow condition optimizing section A, the plastic temperature measurement data G4 thus supplied is used instead of the constant plastic temperature used as the precondition of the calculation.

Thus, the optimum flow condition is determined again using the plastic temperature measurement data G4 and the new optimum flow condition thus determined is supplied to the operating condition determining section B. Therefore, it is possible to produce molded parts having a higher quality.

As described above, the system does not require the knowledge of the skilled-operator and operators having no technical skill can carry out the injection molding by using the systems. However, there are some types of molded parts for which this system is not perfect. This is because, the plastic flow condition optimizing software which are presently utilized have a limitation with respect to ability, and therefore the software cannot perfectly provide the optimum injection-side conditions in perfect required for the control of the Injection molding machine with respect to such a part of molded parts.

For example, there are some molded parts which often cause a defect such as a burn mark or jetting. The present utilized plastic flow condition optimizing software does not have the ability to optimize the plastic flow condition for such a molding part so that a defect does not occur.

It is a fact that the present utilized plastic flow condition optimizing software does not have the ability to handle such types of molded parts. However, it is possible to construct the plastic flow condition optimizing section of the present invention having the ability to optimize the plastic flow condition of such a molded part. This is because, the ability to optimize the plastic flow condition of such a molded part is omitted in the present utilized plastic flow condition optimizing software for economical reasons, i.e., the small demand for such software, high cost, and the required analysis time for the optimization.

For example, air exists in the actual cavity of the mold before the plastic injection. However, the present utilized plastic flow condition optimizing software ignores the existence of air in the cavity and determines the optimum plastic flow condition according to a simplified algorithm which is based on the precondition that the cavity is a vacuum before the plastic injection. Therefore, the true optimum plastic flow condition is not obtained due to burn marks.

Theoretically, it is possible to prevent burn marks by such calculations as below.

a. The optimum flow condition is calculated on the precondition that air exists in the cavity before the plastic injection.

b. The optimum flow condition is determined using an equation of adiabatic gas compression, the capacity for deaerating air from the cavity, and the data of relation between the plastic temperature, the lapse time, and the deterioration of the plastics.

Third Preferred Embodiment

In the systems shown in FIGS. 1 and 2, the operator can input the mold design data to the clamping-side condition determining section B-2 by operating input means (not shown).

Figure 3:
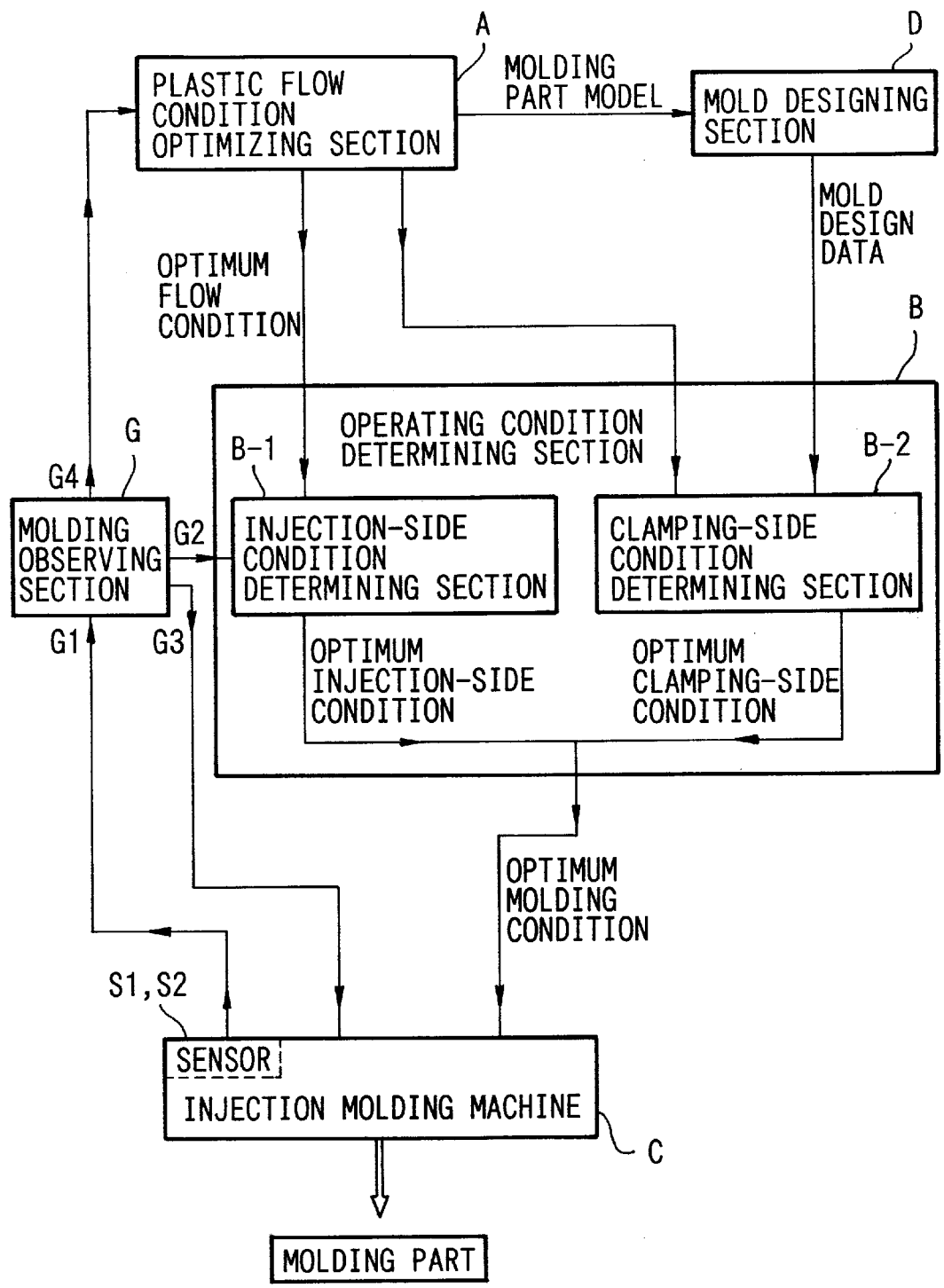
FIG. 3 is a block diagram showing a configuration of a molding condition optimizing system for an injection molding machine according to a third preferred embodiment of the present invention.

Instead of the use of such input means, mold design means D such as a CAD system for designing concrete structures of molds may be coupled to the clamping-side condition determining section B-2 as shown in FIG. 3.

In the system shown in FIG. 3, the design of the concrete structure of the mold is carried out by the mold design means D using the molded part form data supplied from the plastic flow condition optimizing section A. When the design of the concrete structure of the mold is completed, the mold design data is generated based on the concrete structure data, and is supplied to the clamp-side condition determining section B-2:

In this system, the manual input operation of the mold design data is not necessary, and therefore the efficiency of the operation is improved.

Fourth Preferred Embodiment

Figure 4:
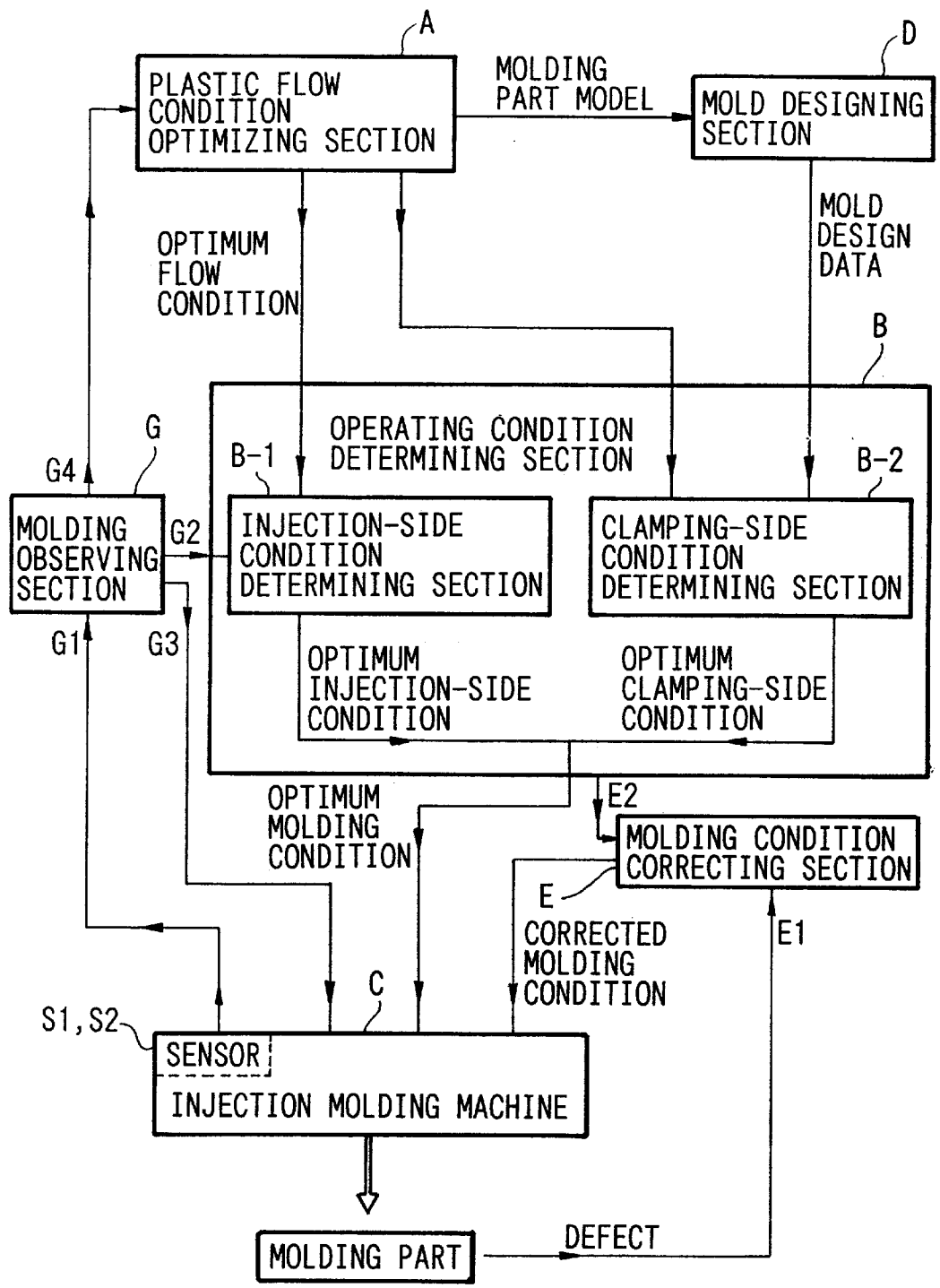
FIG. 4 is a block diagram showing a configuration of a molding condition optimizing system for an injection molding machine according to a fourth preferred embodiment of the present invention.

FIG. 4 is a block diagram showing the configuration of a fourth preferred embodiment of the present invention. In this preferred embodiment, the plastic flow condition optimizing section A is a device which is presently utilized as a plastic flow condition optimizing device. A molding condition correcting section E is provided in order to supplement the insufficiency of the capacity of the plastic flow condition optimizing section A.

The molding condition correcting section E is a means which is provided by the computer executing a software program like the plastic flow condition optimizing section A, the operating condition determining section B, and the molding observing section G.

In the system shown in FIG. 4, the molding condition correcting section E is inserted between the operating condition determining section B and the injection molding machine C.

Data E1 indicating the defects of the molding parts produced by the injection molding machine C is inputted to the molding condition correcting section E. Furthermore, data E2 to be used for determining the cause of the defect and the countermeasures for the defect are supplied to the molding condition correcting section E. This data E2 includes the optimum molding condition data outputted by the operating condition determining section B and the data indicating the name of the plastic, the gate dimension of the mold, and the thickness of the molding part. The molding condition correcting section E generates a corrected molding condition, which is more appropriate for the injection molding than the optimum molding condition, based on the data E1 and E2 thus supplied, and on a defect cause knowledge database and a countermeasure knowledge database.

The defect-cause knowledge database includes a plurality of data for determining the cause of defects such as short shots, sink marks, etc. On the other hand, there are many kinds of causes even for one defect such as insufficiency of holding pressure, low temperature of melted plastics, in sufficiency of gas venting, etc. The defect cause knowledge database includes data for determining one or more cause, according to the type and the level of the defect. When a plurality of causes correspond to one type of defect, one of the cause is selected by the predetermined priority.

The countermeasure knowledge database includes data for assuming countermeasures for defects, knowing the cause of the defect obtained by using the defect cause knowledge database, and for correcting the data of the optimum molding condition (the optimum injection-side condition and the optimum clamping-side condition) according to the countermeasure.

More specifically, the countermeasure database constitutes a matrix. The rows of this matrix correspond to the causes of defects which are to be specified based on the defect cause knowledge database. The columns of the matrix correspond to the defects which are to be bases for determining the causes. Each element of the matrix defines a countermeasure which is to be carried out when a defect corresponding to the column of the element and a cause of defect corresponding to the row of the element are assumed.

The examples of the countermeasures defined by the elements of the matrix are as follows:

a. Increasing the holding pressure by "a" ($kgf/cm^2$)

b. Extending the holding pressure time by "b" (sec)

c. Increasing the temperature of the mold by "c" (° C.)

The molding condition correcting section E determines the cause of the defect according to the defect cause database, the defect indicated by the data E1, and the data E2, and then determines the countermeasure corresponding to the defect according to the countermeasure database, and then corrects the data of the optimum molding condition (the optimum injection-side condition and the optimum clamping-side condition) according to the countermeasure thus determined. The corrected molding condition thus generated is supplied to the injection molding machine C.

In the injection molding machine C, the molding is carried out again by the corrected molding condition supplied from the molding condition correcting section E.

This procedure mentioned above is carried out again and again until the product becomes perfect.

In this preferred embodiment, the data (E2) to be used for determining the cause of the defect and the countermeasures for the defect are supplied from the operating condition determining section B to the molding condition correcting section E. However, a method for supplying the data is not limited to the method of the preferred embodiment. For example, the data (E2) can be supplied from the injection molding machine C to the molding condition correcting section E.

Fifth Preferred Embodiment

The data E1 indicating the defect of the molding part may be inputted to the molding condition correcting section E by operating input means such as a keyboard. However, it is preferable to use automated input means for inputting the defect of the molding part in order to improve the efficiency of the operation of the operator.

Figure 5:
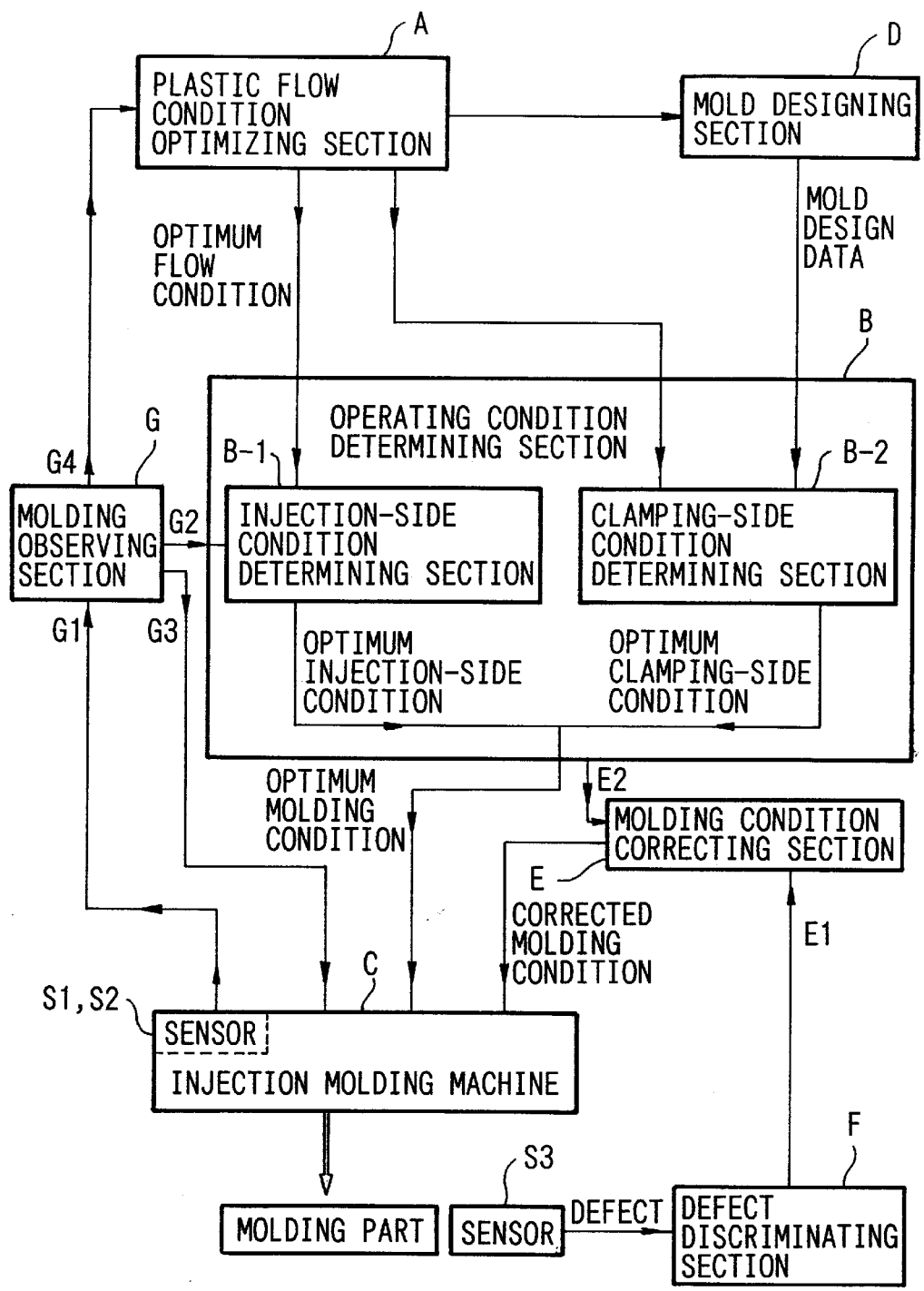
FIG. 5 is a block diagram showing a configuration of a molding condition optimizing system for an injection molding machine according to a fifth preferred embodiment of the present invention.

In the fifth preferred embodiment, therefore, a defect discriminating section F is provided as shown in FIG. 5 in order to automate the supply of the defect data.

The defect discriminating section F automatically determines the defect and its level for the molding part according to the output data of the sensor S3 which is fixed to the injection molding machine C, and supplies data indicating the defect and the level thereof to the molding condition correcting section E.

In this preferred embodiment, it is not necessary for the operator to judge the defect and the level thereof of the molding part and to input the defect and the level thereof into the molding condition correcting section E because they are automatically supplied to the molding condition operating section E by the defect discriminating section F. Therefore, the efficiency of the operation is improved.

The defect discriminating system F preferably may be a vision system. In this system, an image sensor for taking a image of the molding part is fixed to the injection molding machine C as the sensor S3. The image data of the molded part is supplied from the sensor S3 to the defect discriminating section F. In the defect discriminating section F, the image data of the molded part is compared with a reference image data which corresponds to a molded part having no defect and is previously stored in a memory to discriminate the defect and the level thereof of the molded part.

In this preferred embodiment, the molding condition is repeatedly and automatically corrected by the molding condition correcting section E by feedback via the defect discriminating section F until no defect is detected by the defect discriminating section F. Therefore, the best optimum molding condition is automatically obtained.

Japanese Patent Second Publication No. Hei 7-20651 discloses a technique which may be used as the molding condition correcting section E.

Application of Preferred Embodiments

A production of a molding part carried out by using the system of the preferred embodiments is made up of a plurality of operations. All the operations can be simultaneously carried out. However, in general, each operation is carried out by using the preferred embodiment sequentially, for example, as follows.

(1) Molding Part Designing Stage

At this stage, a molding part to be produced is designed, and the strength and the formability of the molding part is investigated. The plastic flow condition optimizing section A is used at this stage.

(2) Mold Manufacturing Stage

At this stage, the design and the manufacturing of the concrete mold is carried out according to the design of the molding part. The mold designing section D is used at this stage.

(3) Production Stage

At this stage, the mass production of the molding part is carried out using the mold. At this stage, the injection molding machine C, the operating condition determining section B, the molding condition correcting section E, the defect discriminating section F. and the molding observing section G are used.

Then, the sections of the preferred embodiment may be divided into the three groups which can be used at different times and places as follows:

Group-1: plastic flow condition optimizing section A
Group-2: mold designing section D
Group-3: operating condition determining section B,
 molding condition correcting section E,
 defect discriminating section F, and
 molding observing section G In the preferred embodiment, all the groups are not installed in the same computer; the groups may be installed in different computers to constitute a distributed system.

In this case, the operating condition determining section B, the molding condition correcting section E, the defect discriminating section F, and the molding observing section G directly communicate with the injection molding machine C. Therefore, one or more of these sections can be installed in a computer which is provided within the injection molding machine C as a controller.

In these distributed system, data communication is carried out among the plastic flow condition optimizing section A, the operating condition determining section B, the injection molding machine C, the mold designing section D, the molding condition correcting section E, the defect discriminating section F, and the molding observing section G. In this system, data communication between the two sections installed in the same computer may be carried out with in one LSI circuit, or via signal lines formed on the same printed board. Data communication between the two sections installed in the different computers may be carried out via a cable of a communication line or via a storage medium such as a floppy disk or an IC card.

While the present preferred embodiments of the present invention have been shown and described, it is to be understood these disclosures are for the purpose of illustration and that various changes and modifications may be made without disparting from the scope of the invention as set forth in the appended claims.

What is claimed is:

1. A molding condition optimizing system for an injection molding machine, the system comprising:

plastic flow condition optimizing means for carrying out a plastic flow analysis on a molded part model, and for determining an optimum flow condition in a filling stage and a packing stage of an injection molding process of the injection molding machine by repeatedly executing an automated calculation using the result of the plastic flow analysis and the plastic flow analysis itself; and operating condition determining means for determining an optimum molding condition consisting of an optimum injection-side condition and an optimum clamping-side condition according to data supplied from the plastic flow condition optimizing means;

wherein the operation condition determining means comprises:

an injection-side condition determining section for determining the optimum injection-side condition of the injection molding machine according to the optimum flow condition obtained by the plastic flow condition optimizing means and a knowledge database with respect to an injection condition; and a clamping-side condition determining section for determining the optimum clamping-side condition according to the molded part form data generated by the plastic flow condition optimizing means, the result of the plastic flow analysis, mold design data, and a knowledge database with respect to a mold clamping condition.

2. A molding condition optimizing system according to claim 1, further comprising:

molding observing means for observing operation of the injection molding machine and for supplying data indicating observed results to one or more of the operating condition determining means, the plastic flow condition optimizing means, and the injection molding machine to improve the optimum molding condition with the supplied data.

3. A molding condition optimizing system according to claim 1, further comprising:

mold designing means for designing a mold using the data of the molding part model which are inputted to the plastic flow condition optimizing means, and for supplying a mold design data indicating the design of the mold to the clamping-side condition determining section of the operating condition determining means.

4. A molding condition optimizing system according to claim 1, further comprising:

molding condition correcting means for correcting the optimum molding condition;

wherein the molding condition correcting means comprises:

a defect cause knowledge database for determining a cause of a defect of a molded part; and a countermeasure knowledge database for determining a countermeasure for the defect according to the cause of the defect, and for determining a data correction of the optimum molding condition which is necessary for carrying out the countermeasure, and the molding condition correcting means which directs the data correction to the injection molding machine.

5. A molding condition optimizing system according to claim 1, further comprising:

defect discriminating means for automatically discriminating types of defects of a molding part and levels of the defects and for supplying a data indicating the type and the level to the molding condition correcting means.

6. A molding condition optimizing system according to claim 1, further comprising:

molding observing means for observing operation of the injection molding machine and for supplying data indicating observed results to one or more of the operating condition determining means, the plastic flow condition optimizing means, and the injection molding machine to improve the optimum molding condition with the supplied data;

defect discriminating means for automatically discrimination types of defects of a molded-part and levels of the defects and for outputting a data indicating a type and a level of the defect; and molding condition correcting means for correcting the optimum molding condition, the molding condition correcting means comprising a defect cause knowledge database for determining a cause of the defect of the molded part indicated by the output data of the defect discriminating means, and a countermeasure knowledge database for determining a countermeasure for the defect according to the cause of the defect, and for determining a data correction of the optimum molding condition which is necessary for carrying out the countermeasure, and the molding condition correcting means which directing the data correction to the injection molding machine, wherein one or more of the operating condition determining means, and the molding condition correcting means, and the defect discriminating means, and the molding observing means are installed in the injection molding machine.

* * * * *

UNITED STATES PATENT AND TRADEMARK OFFICE
CERTIFICATE OF CORRECTION

PATENT NO.   : 5,900,259
DATED        : May 4, 1999
INVENTOR(S)  : Yoji Miyoshi, et al.

It is certified that error appears in the above-identified patent and that said Letters Patent is hereby corrected as shown below:

Column 8,
Line 42, "2.3" should read -- 2.3. + Height Of Sprue --

Column 11,
Line 41, "to-the" should read -- to the --
Line 47, "GI" should read -- G1 --

Signed and Sealed this

Sixth Day of November, 2001

Attest:

NICHOLAS P. GODICI
Attesting Officer    Acting Director of the United States Patent and Trademark Office